United States Patent
Runge et al.

(10) Patent No.: US 8,304,052 B2
(45) Date of Patent: Nov. 6, 2012

(54) FRICTION LINING

(75) Inventors: Oliver Runge, Windeck (DE);
Tim-Florian Gerbing, Betzdorf (DE);
Thorsten Weyel, Willmenrod (DE);
Christian Spandern, Elkenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 122 days.

(21) Appl. No.: 12/847,083

(22) Filed: Jul. 30, 2010

(65) Prior Publication Data
US 2010/0294615 A1  Nov. 25, 2010

Related U.S. Application Data

(63) Continuation of application No. PCT/DE2008/002145, filed on Dec. 22, 2008.

(30) Foreign Application Priority Data

Jan. 31, 2008 (DE) .......................... 10 2008 007 050

(51) Int. Cl.
*F16D 69/02* (2006.01)
(52) U.S. Cl. .................................. 428/66.2; 192/107 M
(58) Field of Classification Search .................. None
See application file for complete search history.

(56) References Cited

U.S. PATENT DOCUMENTS

| | | | | |
|---|---|---|---|---|
| 2,277,602 A * | 3/1942 | Novak | ...................... | 192/107 M |
| 3,068,131 A * | 12/1962 | Morton | .......................... | 428/66.2 |
| 3,738,901 A | 6/1973 | Matsushima et al. | | |
| 3,751,330 A * | 8/1973 | Gilbert | ....................... | 188/251 A |
| 6,471,807 B1 * | 10/2002 | Shimoi et al. | .................. | 156/175 |
| 7,954,608 B2 * | 6/2011 | Spandern et al. | ....... | 188/218 XL |
| 2003/0116398 A1 | 6/2003 | Nomura | | |

FOREIGN PATENT DOCUMENTS

| | | |
|---|---|---|
| DE | 195 03 738 A | 4/1996 |
| EP | 1 063 444 | 12/2000 |

\* cited by examiner

*Primary Examiner* — Rodney Bonck
(74) *Attorney, Agent, or Firm* — Lucas & Mercanti, LLP; Klaus P. Stoffel

(57) ABSTRACT

A friction lining, which has a friction part and a backing part. As a preform, wound from a strand material and treated with a binder, the friction part is subjected to hot pressing. It is suggested that the backing part is subjected to hot pressing together with the preform, so that a bond is created between the friction part and the backing part by the polymerization of the binder.

4 Claims, 1 Drawing Sheet

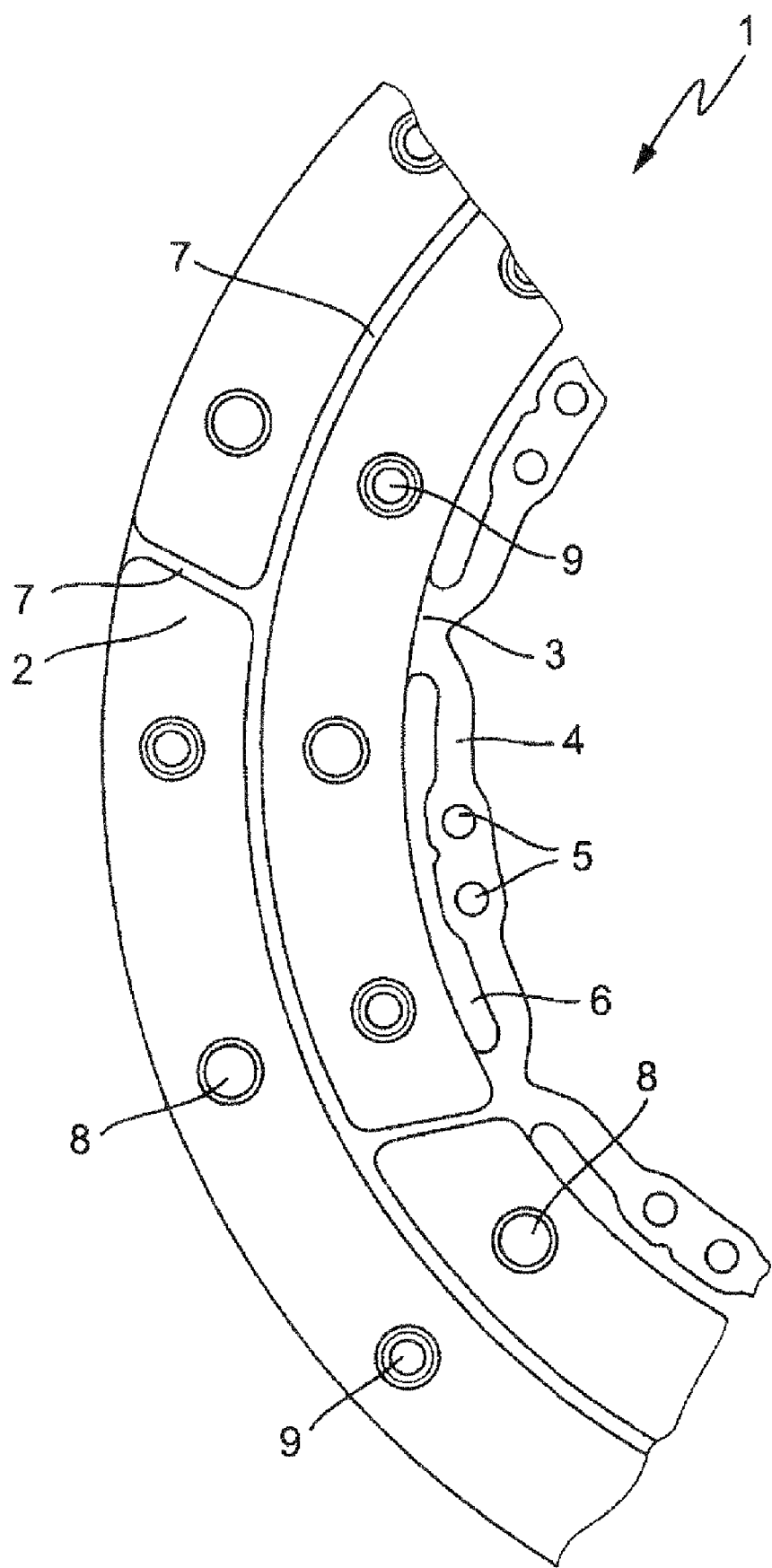

FRICTION LINING

This application is a continuation application of PCT/DE2008/002145 filed Dec. 22, 2008, which in turn claims the priority DE 10 2008 007 050.5, filed Jan. 31, 2008, the priority of these applications is hereby claimed and these applications are incorporated by reference herein.

FIELD OF THE INVENTION

The invention relates to a friction lining and also to a process for producing a friction lining, in particular for clutch disks, comprising a friction part of wound strand material and a carrier part.

BACKGROUND OF THE INVENTION

Friction linings of this type are used, in particular, for clutch disks of friction clutches in motor vehicles, a frictional lock between metallic friction surfaces of the friction clutch and the friction linings which, depending on the mode of operation of the friction clutch, can adhere or slip and transmits a corresponding torque from a drive unit to an output.

Owing to the high rotational speeds of the friction clutch, the friction lining is to have a high rotational bursting speed. In order to ensure long-term operation, the friction lining is to be wear-resistant and nevertheless have good coefficients of friction.

In order to increase the bursting strength of the friction lining, it is already known to deposit binder-impregnated strand material of friction-resistant materials, for example yarn, in a plurality of flat plies in a corrugated manner in the circumferential direction, the turns of the strand material being guided elliptically, for example, from outside diameter to outside diameter forming reversal regions and keeping the inside diameter free, the reversal regions from one turn to the other being offset in each case at an angle over the circumference. It is therefore possible to increase the portion of strand material in the overall composition of the friction lining and thus the friction and bursting strength of the latter. Winding usually takes place with the aid of a winding machine, one ply by definition being wound per revolution in the circumferential direction. The number of reversal regions on the external circumference of the friction lining is referred to as the winding ratio. By way of example, a winding ratio of 1:10 describes that the strand material has ten reversal regions on the external circumference over one circumference. Blanks wound in this manner are pressed to their final shape in a hot-pressing process. In order to obtain a stable and nondeformable friction lining which provides the required performance, the latter is designed in an empirically determined thickness which, in addition to the friction layer which diminishes as a result of wear during operation, includes a carrier layer which, in particular, may have another winding beneficial for the load-bearing capacity.

Particularly in the case of thin friction linings, the friction lining may become warped under the action of heat. Use is therefore made of metal carrier sheets which, after the friction part formed from the hot-pressed blank has been produced, are adhesively bonded to the carrier part in a plurality of process steps to form a friction lining.

SUMMARY OF THE INVENTION

It is therefore an object of the invention to propose a wound friction lining which is easier and less expensive to produce.

This object is achieved by a friction lining, in particular for a friction clutch, comprising an annular friction part, produced at least from strand material and binders, and an annular carrier part, wherein the strand material, as a wound blank treated with binder, is subjected to a hot-pressing process for the production of the friction part, and the blank is pressed together with the carrier part during the hot-pressing process.

Furthermore, this object is achieved by a process for producing a friction lining comprising a wound friction part and a carrier part, having the following process steps:

binders are applied to strand material with binder,
a blank of strand material is wound,
the blank is centered on the carrier part, and
the blank and the carrier part are subjected to hot pressing.

The pressing of the carrier part and the friction part by the hot-pressing process eliminates the need for the complex adhesive bonding of the two parts to one another. It is therefore possible to omit working steps such as adhesive application, adhesive drying and joining of the flashed-off parts, and also to avoid the use of adhesive material. A step equivalent to adhesive bonding during the hot-pressing operation is the polymerization of components of the friction part, for example of the binder, and this leads to a tight bond between the friction part and the carrier part and thus replaces adhesive bonding.

The blank is advantageously formed from strand material treated with binders. In this context, the strand material, which is optimized in terms of coefficient of friction and wear, is adjusted to a constant ratio of binder and strand material. By way of example, the strand material may be formed from aramid fibers, glass staple fibers, viscose fibers and PAN fibers, and also brass wire or for example from glass filaments and metal wires. The polymeric components, which experience further crosslinking or polymerization during the hot-pressing process, for example by condensation reactions, addition reactions or substitution reactions, may consist of thermosetting components, for example phenolic resin or melamine resin, and also elastomeric components, for example SBR or NBR rubber. Examples of fillers are barium sulfate, kaolin or carbon black. The dried strand material is then wound to form a blank.

Suitable carrier parts are stable plastics and particularly sheet metal parts. Before they are pressed together with the blank, the carrier parts are advantageously prepared for bonding thereto, for example degreased and/or roughened. Alternatively or in addition, the surface for bonding to the binder may be activated by polymerization reactions, for example polarized or treated with acid. The carrier part may be punched from sheet metal and may have, for example, lugs with openings to be received on flange parts of the clutch disk radially within the internal circumference of the annular friction part. By way of example, two friction linings may be placed together on the carrier parts, with lining spring segments placed in between, and riveted to a flange part of a clutch disk. For axial securing and torsional strength, openings can be made in the friction linings after the hot-pressing operation, and the two friction linings located opposite one another are riveted to the lining spring segments through these openings. Since the carrier layer produced from lining material is replaced by a carrier part made from sheet metal, it is possible for the wound friction lining to have a significantly thinner design.

According to the inventive concept, friction linings produced in this way can be further optimized by adapting the thermal coefficient of the friction part to the expansion of the carrier part. This advantageously takes place in addition to the coordination of the material on the basis of the winding ratio of the blank. It has been found that the coefficient of thermal expansion is influenced by the orientation, predefined by the winding ratio, of the friction lining surface, which is bounded by the radius and the circumference, of the individual strands of the strand material in the radial or circumferential direction. It has also been found that particularly good coordination can be achieved in conjunction with a carrier part of sheet metal when there are winding ratios between 1:2 and 1:6.

During production by the hot-pressing process, the blank is advantageously centered on the carrier part, it being possible for the carrier part to be positioned, for example by means of the lugs, on a charging or pressing tool at the internal circumference, and in this respect the blank is centered at the internal and external circumferences on the carrier part, such that the internal and external radii of the friction part are flush with the carrier part.

BRIEF DESCRIPTION OF THE DRAWING

The present invention will be further understood and appreciated by reading the following description in conjunction with the accompanying drawing, in which:

The FIGURE is a sectional view of a friction lining of the present invention.

DETAILED DESCRIPTION OF THE INVENTION

The invention is explained in more detail on the basis of the single FIGURE. This shows part of a friction lining 1 comprising a friction part 2 and a carrier part 3 of sheet metal as a view onto the friction part 2. The carrier part 3 has the same outside diameter as the friction part 2 and has radially inwardly expanded lugs 4 which are held on the clutch disk by means of openings 5, for example riveted to a flange part of the clutch disk with a further friction lining in a mirror-inverted manner, with lining spring segments placed in between. The cutouts 6 in the carrier part 3, which has preferably been punched, serve to hold the friction linings in an elastic manner on the clutch disk, for example in order to compensate for wobbling vibrations between the drive unit and the transmission input shaft, on which the clutch disk is held.

The friction part 2 is held on the carrier part 3 by means of a hot-pressing process and is integrally bonded thereto by means of polymerization reactions of the binder. During the hot-pressing operation, the surface shape of the friction part is predefined. For this purpose, it is possible, for example, to impress grooves 7 in the radial direction and/or in the circumferential direction. Two types of countersunk openings 8, 9 are distributed over the circumference, and these serve to rivet two friction linings 1 arranged in a mirror-inverted manner to the clutch disk, the wider openings 8 each holding the rivet head and the openings 9 having the smaller diameter holding the rivet shafts of a clutch disk riveted on both sides.

Clutch disks equipped with these friction linings are advantageous, in particular, for use in dual clutches for dual-clutch operations since, owing to the reduced overall axial height of the friction linings, it is possible to use them in narrow installation spaces.

LIST OF REFERENCE NUMERALS

1 Friction lining
2 Friction part
3 Carrier part
4 Lug
5 Opening
6 Cutout
7 Groove
8 Opening
9 Opening

The invention claimed is:

1. A friction lining for a friction clutch, comprising:
   an annular friction part, produced at least from strand material and binders; and
   an annular carrier part,
   wherein the strand material, as a wound blank treated with binder, is subjected to a hot-pressing process for production of the friction part,
   wherein the blank is pressed together with the carrier part during the hot-pressing process,
   wherein a thermal coefficient of the friction part is set on a basis of a winding ratio of the blank, and
   wherein the winding ratio is between 1:2 and 1:6.

2. The friction lining of claim 1, wherein a bond is established between the friction part and the carrier part during the hot-pressing operation by means of polymerization of the binder.

3. The friction lining of claim 1, wherein the carrier part is prepared for the hot-pressing process, centered at an internal circumference, and the blank is prepared for the hot-pressing process, positioned radially on an outside and radially on an inside and centered on the carrier part.

4. The friction lining of claim 1, wherein the carrier part is formed from sheet metal.

* * * * *